(12) United States Patent
Hartlieb et al.

(10) Patent No.: US 6,179,356 B1
(45) Date of Patent: Jan. 30, 2001

(54) IMPACT DAMPER FOR A MOTOR VEHICLE AND METHOD OF MAKING SAME

(75) Inventors: Markus Hartlieb, Walddorfhaeslach; Matthias Nohr, Stuttgart, both of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/173,782

(22) Filed: Oct. 16, 1998

(30) Foreign Application Priority Data

Oct. 16, 1997 (DE) ............................................. 197 45 651

(51) Int. Cl.$^7$ ........................... B60R 19/28; B60R 19/30; B60R 19/34
(52) U.S. Cl. ........................... 293/133; 293/136; 293/137
(58) Field of Search ................................... 293/109, 117, 293/136, 138, 133, 132, 134, 135, 139, 137; 188/371, 377, 376

(56) References Cited

U.S. PATENT DOCUMENTS

| | | | |
|---|---|---|---|
| 2,508,347 | * 5/1950 | Marsh | 293/137 |
| 3,295,880 | * 1/1967 | Klosterman | 293/137 |
| 3,789,948 | 2/1974 | Hrebicek . | |
| 3,797,874 | * 3/1974 | Tufano | 293/134 |
| 3,861,488 | * 1/1975 | Hamada et al. | 293/117 |
| 3,908,781 | * 9/1975 | Oishi et al. | 293/117 |
| 5,078,439 | * 1/1992 | Terada et al. | 293/109 X |
| 5,393,111 | * 2/1995 | Eipper et al. | 293/109 |

FOREIGN PATENT DOCUMENTS

| | | |
|---|---|---|
| 41 21 497 C2 | 2/1993 | (DE) . |
| 196 33 110 A1 | 2/1997 | (DE) . |

* cited by examiner

Primary Examiner—D. Glenn Dayoan
Assistant Examiner—Jason Morrow
(74) Attorney, Agent, or Firm—Evenson, McKeown, Edwards & Lenahan, P.L.L.C.

(57) ABSTRACT

An impact damper for a motor vehicle comprises an impact plate on which a collision force acts, as well as an elastically deformable part adjoining the impact plate in the impact direction, by whose elastic deformation in a collision impact energy is absorbed. At least one plastically deformable part is selectively connectable with the elastically deformable part. The plastically deformable part being subject to the influence of the impact plate and being plastically deformable as it absorbs energy in a vehicle collision when connected to operate together with the elastically deformable part.

16 Claims, 2 Drawing Sheets

IMPACT DAMPER FOR A MOTOR VEHICLE AND METHOD OF MAKING SAME

BACKGROUND AND SUMMARY OF THE INVENTION

This application claims the priority of German Patent Application No. 197 45 651.0, filed Oct. 16, 1997, the disclosure of which is expressly incorporated by reference herein.

The invention relates to an impact damper for a motor vehicle with an impact plate on which an impact force acts, and an elastically deformable part adjoining the impact plate in an impact direction, with energy absorbed in a collision by the elastic deformation of said elastically deformable part.

An impact damper in the front of a motor vehicle is known from U.S. Pat. No. 3,789,948, said damper having an elastically deformable part with a spring located behind an impact plate on the front bumper, with energy absorbed in a vehicle collision as a result of the deformation of this spring. Depending on the vehicle speed, the impact damper is adjusted for the impact to be softer or harder by a change in spring force. This influence on the spring is accomplished in a costly and cumbersome fashion by an adjustable pressure pump acting on a hydraulic piston.

German Patent Document DE 196 33 110 A1 describes an impact damper for a motor vehicle that has deformation elements with different degrees of stiffness that are plastically deformable in various impact speed ranges to absorb impact energy. The less rigid deformation element is permanently attached in a vehicle zone that receives impact energy, while the more rigid deformation element is moved with respect to the less rigid deformation element as a function of the vehicle speed. During its stress under impact, the impact damper can act to absorb energy only by plastic deformation, so that repair of the impact damper is always necessary. The change in damping behavior can be achieved only through a translational or pivoting movement of the more rigid deformation element by means of a drive, which must then also be able to withstand the stress, making this impact damper costly as well.

A bumper system for motor vehicles follows from German Patent Document DE 41 21 497 C2 that comprises an impact absorber with an impact-damping piston and an impact-damping cylinder. By determining the relative speed between the impact-damping piston and the impact-damping cylinder, a locking mechanism can be activated that can prevent further displacement of the impact-damping piston, whereupon plastic deformation of the impact damper begins to absorb impact energy. Impacts against the bumpers of the motor vehicle are absorbed, with the bumper yielding and the impact-damping piston being pushed into the impact-damping cylinder, so that the bumper likewise no longer returns to its initial position and a visit to a garage is necessary. A considerable structural length is also required for accommodating the piston/cylinder system.

A goal of the invention consists in designing an impact damper of the type discussed above, which can be made economically and so that it can adapt its deformation resistance to the load in a vehicle collision.

This goal is achieved by providing such an impact damper, wherein at least one part can be connected to the elastically deformable part, said plastically deformable being capable of being impacted by the impact plate and absorbing energy plastically in a vehicle collision.

An impact damper for a motor vehicle that has an elastically deformable part that follows an impact plate in the impact direction can absorb impact energy by deformation of this part in the event of a gentle impact of the vehicle, whereupon the elastic part resumes its original shape. For example, a displaced bumper, which acts on the impact damper under the influence of impact force will therefore then be returned to its original position, so that no repairs to the vehicle will be needed.

In order to increase energy absorption in the impact damper for a powerful vehicle collision, a plastically deformable part that can be impacted by the impact plate and is plastically deformable in a vehicle collision can be connected with this elastically deformable part, said part then being able to absorb impact energy additionally and in a greater amount.

The part that is deformable elastically and the part that is deformable plastically in an energy-absorbing fashion can be located to operate in parallel vertically, so that the impact damper, despite considerable absorption ability, need have only a relatively limited height. The least space for installation is then required when one deformable part is made tubular and surrounds the other deformable part with an approximately parallel or even coaxial lengthwise axis.

A coil spring or a plastic damper can be used economically as the elastic part, while the plastically deformable part can simply be formed by a tube.

The plastically deformable part can be connected to the elastically deformable part in simple fashion by a locking part moving into the displacement path of the plastically deformable part that is displaceable by the impact of the impact plate, with the locking part initiating the deformation of the plastically deformable part.

This displaceable locking part can be accommodated integrated into a vehicle-integral support for the elastically deformable part, so that the impact damper requires only limited space as a result.

The two switching positions of the impact damper—an elastic reaction for example to a bump when parking or elastic and plastic reaction in a stronger vehicle collision—can be controlled on the basis of a measured value detected before or during the collision.

In addition, it is also contemplated to certain preferred embodiments of the invention to connect a plurality of cooperating plastically deformable parts in order thus to achieve an especially high degree of energy absorption of the impact damper in the event of a vehicle collision.

Other objects, advantages and novel features of the present invention will become apparent from the following detailed description of the invention when considered in conjunction with the accompanying drawings.

DETAILED DESCRIPTION OF THE DRAWINGS

The figures show an impact damper 1 for a motor vehicle, not shown in greater detail, said damper being located for example in the vehicle behind a bumper and to whose impact plate 2 the forces are transmitted that act on the bumper in a collision. Impact damper 1, in the embodiments shown, can have two switching positions in which it reacts softer or harder and thus can absorb more or less impact energy.

Figure 1B:
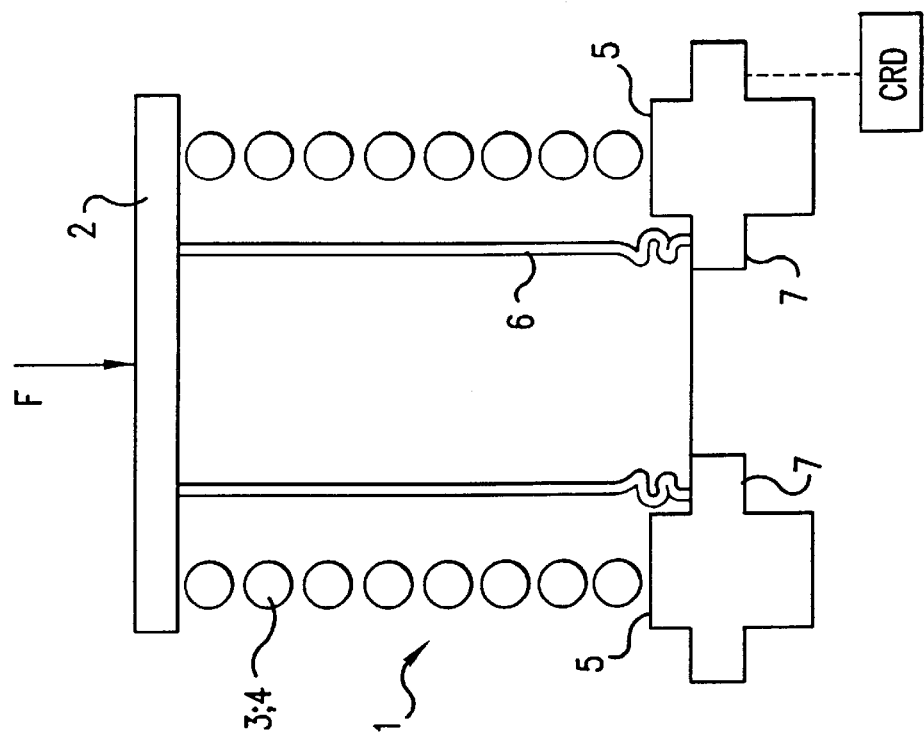
FIG. 1b shows the impact damper in FIG. 1a in a position subjected to force with the associated plastically deformable part.
Figure 1A:
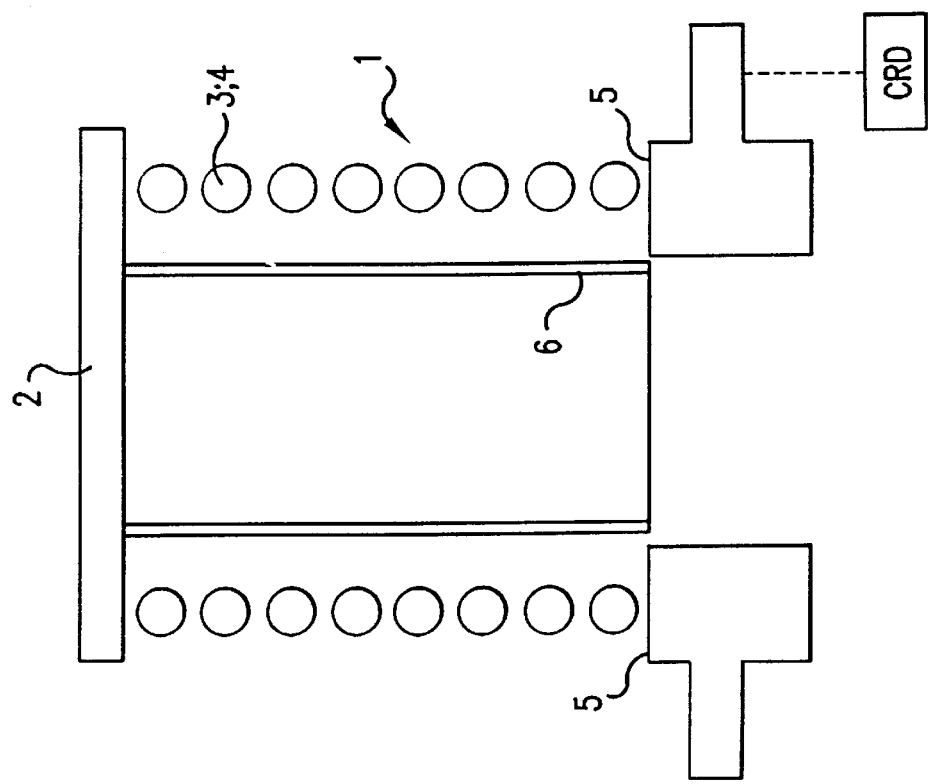
FIG. 1a is a schematic side sectional view of an impact damper with an elastically deformable spring and a plastically deformable part on an impact plate, constructed according to a preferred embodiment of the invention.

In FIGS. 1a and 1b, impact damper 1 comprises an elastically deformable part 3 which in this case is formed by an inexpensive coil spring 4 which, in a gentle collision of the vehicle, for example a bump during parking, is compressed in the axial direction against a support 5 integral with the vehicle and thus absorbs, i.e. receives, impact energy, and then returns to its relaxed position, with impact plate 2 and the bumper for example likewise returning to their original positions. Repairing the motor vehicle following such minor stresses is therefore not necessary.

A tubular part 6 connected with impact plate 2 can also be stressed by it, said tubular part, during compression of coil spring 4 being pushed between the vehicle-integral support 4 and the impact plate 2.

In a stronger collision of the motor vehicle, in which greater energy absorption is necessary to protect the occupants, and which can be detected by a measured collision value or by a control signal of a precrash recognition device, schematically depicted as a crash recognition device (CRD). The elastically deformable coil spring 4 is connected with tubular part 6 to absorb energy. For this purpose, as shown in FIG. 1b, tubular part 6 is prevented by a locking part 7 from being displaced by impact plate 2 as the result of a collision force (arrow F) and is thus plastically deformed. This plastic deformation results in a sharp increase in energy absorption during a vehicle collision.

Since coil spring 4 surrounds tubular part 6 with an approximately parallel lengthwise axis, and locking part 7 is also integrated into vehicle-integral support 5, this impact damper 1, despite its high energy-absorbing effect, requires relatively little space for installation.

Figure 2B:
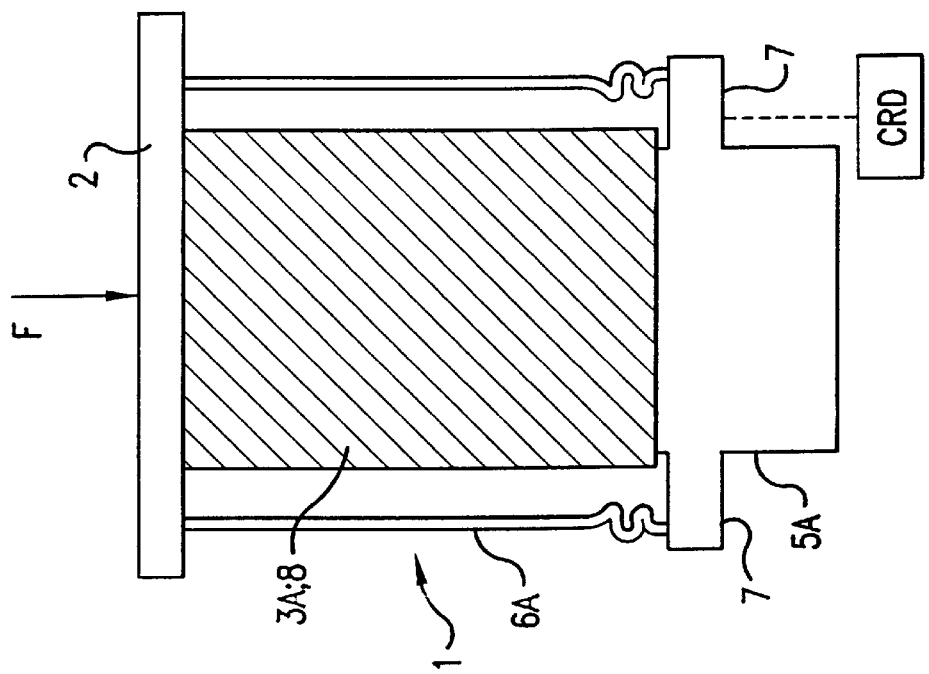
FIG. 2b shows the impact damper in FIG. 2a with the attached plastically deformable part subject to force.
Figure 2A:
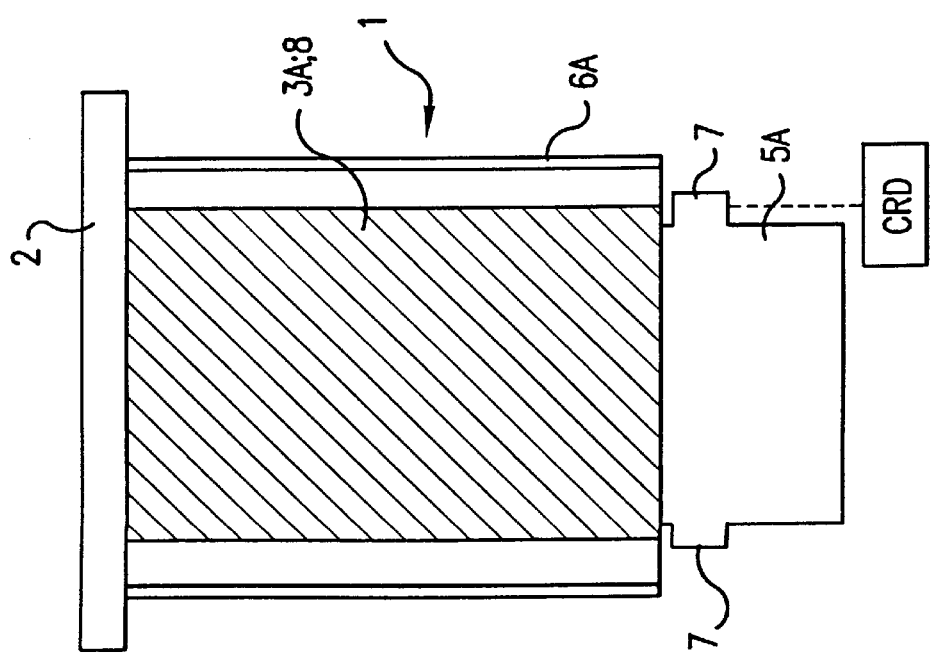
FIG. 2a is a schematic side sectional view of another embodiment of an impact damper with an elastically deformable plastic damper.

FIGS. 2a and 2b show an impact damper 1 that functions in this manner, in which elastically deformable part 3A is formed by a plastic damper 8 and plastically deformable part 6A is made tubular.

Impact damper 1, upon a gentle collision, is connected as shown in FIG. 2a, with plastic damper 8, not shown here, being compressible in the axial direction to absorb the energy of a force acting on impact plate 2, while tubular part 6A is pushed past on the vehicle integral support 5 for plastic damper 8. Then the plastic damper assumes its original axial length by acting elastically and a bumper that is moved by impact plate 2 is likewise returned to its initial position.

In a severe vehicle collision, locking part 7A is pushed out of support 5A by a drive, not shown, and the displacement path of tubular part 6A is blocked so that this part 6A, with significant energy absorption, is deformed plastically by the impact energy (arrow F) against the resistance of locking part 7A.

In this case as well, the locking part can be controlled by a measured collision value or a control signal from a precrash recognition device.

To save space, tubular part 6A comprises plastic damper 8, and movable locking part 7A is likewise integrated into vehicle integral support 5A.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An impact damper for a motor vehicle, with an impact plate on which an impact force acts, an elastically deformable part adjoining the impact plate in a direction of application of said impact force, with energy from said impact force absorbed by an elastic deformation of said elastically deformable part, and at least one plastically deformable part, wherein said plastically deformable part is impacted by the impact plate and absorbs energy plastically during a collision of said motor vehicle, and wherein a displacement of the plastically deformable part caused by the impact plate can be blocked by a movable locking part as a deformation resistance, wherein the movable locking part is movable by a control signal from a precrash recognition device.

2. Impact damper according to claim 1, wherein the elastically deformable part and the plastically deformable part are arranged to act in parallel.

3. Impact damper according to claim 1, wherein one of said deformable parts is tubular and surrounds the other deformable part with an approximately parallel lengthwise axis.

4. Impact damper according to claim 1, wherein a support integral with the vehicle for engagement with the elastic deformable part also surrounds the locking part in an integral manner.

5. An impact damper for a motor vehicle, with an impact plate on which an impact force acts, an elastically deformable part adjoining the impact plate in a direction of application of said impact force, with energy from said impact force absorbed by an elastic deformation of said elastically deformable part, and at least one plastically deformable part, wherein said plastically deformable part is impacted by the impact plate and absorbs energy plastically during a collision of said motor vehicle, and wherein a displacement of the plastically deformable part caused by the impact plate can be blocked by a movable locking part as a deformation resistance, wherein movement of the movable locking part is controlled as a function of a measured collision value output from a control device.

6. Impact damper according to claim 1, wherein the elastically deformable part is designed as a coil spring.

7. Impact damper according to claim 1, wherein the elastically deformable part is designed as a plastic damper.

8. Impact damper assembly for a motor vehicle, comprising:
   an impact plate;
   an elastically deformable part interposed between the impact plate and vehicle body structure and operable to elastically resist movement of the impact plate toward the body structure;
   a plastically deformable part disposed adjacent to and movable with the impact plate and the elastically deformable part; and
   a locking part moveable to engage the plastically deformable part such that movement of the impact plate toward the body structure, when a force exceeding a predetermined value causes said movement of the impact plate, is resisted by both elastic deformation of the elastically deformable part and plastic deformation of the plastically deformable part.

9. Impact damper assembly according to claim 8, wherein said elastically deformable part is a spring and the plastically deformable part is a tubular member disposed concentrically with respect to the spring.

10. Impact damper assembly according to claim 9, wherein said spring is a coil spring.

11. Impact damper assembly according to claim 10, wherein said coil spring surrounds the tubular member.

12. Impact damper assembly according to claim 8, comprising a collision recognition device which moves said locking part from a rest position away from engagement with the plastically deformable part and into a collision resisting position interposed between the body structure and impact plate.

13. Impact damper assembly according to claim 8, wherein said elastically deformable part and said plastically deformable part are parallel to one another between the impact plate and the body structure.

14. Impact damper assembly according to claim 13, wherein the plastically deformable part and body structure are disposed so as not to contact one another during low speed vehicle collisions with the locking part in a normal driving condition position.

15. A method of making an impact damper assembly for a motor vehicle, comprising:

providing an impact plate;

interposing an elastically deformable part between the impact plate and vehicle body structure so as to be operable to elastically resist movement of the impact plate toward the body structure;

providing a plastically deformable part adjacent to and movable with the impact plate and the elastically deformable part; and providing a movable locking part operable to engage the plastically deformable part such that movement of the impact plate toward the body structure during certain collision conditions, when a force exceeding a predetermined value causes said movement of the impact plate, is resisted by both elastic deformation of the elastically deformable part and plastic deformation of the plastically deformable part.

16. A method of making an impact damper assembly for a motor vehicle according to claim 15, wherein said elastically deformable part is a spring and the plastically deformable part is a tubular member disposed concentrically with respect to the spring.

* * * * *